(12) United States Patent
Freikorn

(10) Patent No.: US 8,261,009 B2
(45) Date of Patent: *Sep. 4, 2012

(54) METHOD AND APPARATUS FOR RETROACTIVE ADAPTATION OF DATA LOCATION

(75) Inventor: Guy Freikorn, Qiryat Ono (IL)

(73) Assignee: Sandisk IL Ltd., Kfar Saba (IL)

( * ) Notice: Subject to any disclaimer, the term of this patent is extended or adjusted under 35 U.S.C. 154(b) by 331 days.

This patent is subject to a terminal disclaimer.

(21) Appl. No.: 12/345,992

(22) Filed: Dec. 30, 2008

(65) Prior Publication Data

US 2010/0169541 A1 Jul. 1, 2010

(51) Int. Cl.
*G06F 12/00* (2006.01)

(52) U.S. Cl. .................. 711/103; 711/156; 711/E12.001

(58) Field of Classification Search .................. 711/103, 711/115, E12.001, 161, 165, 156, 154
See application file for complete search history.

(56) References Cited

U.S. PATENT DOCUMENTS

| | | |
|---|---|---|
| 4,607,346 A | 8/1986 | Hill |
| 5,636,355 A | 6/1997 | Ramakrishnan et al. |
| 5,778,392 A | 7/1998 | Stockman et al. |
| 5,883,904 A | 3/1999 | Arimilli et al. |
| 5,895,488 A | 4/1999 | Loechel |
| 5,930,167 A | 7/1999 | Lee et al. |
| 5,937,425 A | 8/1999 | Ban |
| 6,363,009 B1 | 3/2002 | Fukuzumi |
| 6,412,045 B1 | 6/2002 | DeKoning et al. |
| 6,678,785 B2 | 1/2004 | Lasser |
| 6,976,128 B1 | 12/2005 | Williams et al. |
| 7,076,605 B1 | 7/2006 | Son |
| 7,124,272 B1 | 10/2006 | Kennedy et al. |
| 7,865,658 B2 | 1/2011 | Lasser et al. |

(Continued)

FOREIGN PATENT DOCUMENTS

EP 1 653 340 A1 5/2006

(Continued)

OTHER PUBLICATIONS

Li-Pin Chang 'Hybrid solid-state disks: Combining Heterogeneous NAND Flash in Large SSDs', Design Automation Conference 2008, ASPDAC 2008, Asia and South Pacific, Mar. 21-24, 2008, pp. 428-433.*

(Continued)

*Primary Examiner* — Pierre-Michel Bataille
(74) *Attorney, Agent, or Firm* — Brinks Hofer Gilson & Lione

(57) ABSTRACT

A method and system for organizing groups of data in a storage device having a non-volatile memory consisting of higher performance or endurance portion and a lower performance or endurance portion are disclosed. The method may include steps of determining a data usage status for a group of data in only one of the two portions, and if a data usage criterion is met, moving the group of data to the other of the two portions of the non-volatile memory. In another implementation, the method may include determining a data usage status of groups of data in both portions of the non-volatile memory and moving a group of data from one portion to the other if an appropriate data usage criterion is met so that groups of data may be maintained in a portion of the non-volatile memory most suited to their usage patterns.

20 Claims, 6 Drawing Sheets

U.S. PATENT DOCUMENTS

| | | |
|---|---|---|
| 2003/0200400 A1 | 10/2003 | Nangle |
| 2004/0073751 A1 | 4/2004 | Horrigan et al. |
| 2005/0055512 A1 | 3/2005 | Kishi |
| 2005/0172082 A1 | 8/2005 | Liu et al. |
| 2005/0193025 A1 | 9/2005 | Mosek |
| 2005/0251617 A1 | 11/2005 | Sinclair et al. |
| 2005/0256838 A1 | 11/2005 | Lasser |
| 2007/0061502 A1 | 3/2007 | Lasser et al. |
| 2007/0118698 A1 | 5/2007 | LaFrese et al. |
| 2007/0150693 A1 | 6/2007 | Kaneko et al. |
| 2007/0239927 A1 | 10/2007 | Rogers et al. |
| 2007/0250660 A1 | 10/2007 | Gill et al. |
| 2007/0283081 A1 | 12/2007 | Lasser |
| 2008/0126680 A1* | 5/2008 | Lee et al. ............... 711/103 |
| 2008/0140918 A1 | 6/2008 | Sutardja |
| 2008/0209109 A1 | 8/2008 | Lasser |
| 2008/0215800 A1* | 9/2008 | Lee et al. ............... 711/103 |
| 2008/0222348 A1 | 9/2008 | Mosek |
| 2008/0235432 A1 | 9/2008 | Chen et al. |
| 2008/0244164 A1 | 10/2008 | Chang et al. |
| 2008/0244202 A1 | 10/2008 | Gorobets et al. |
| 2008/0307158 A1 | 12/2008 | Sinclair |
| 2008/0307192 A1 | 12/2008 | Sinclair et al. |
| 2009/0157974 A1 | 6/2009 | Lasser |
| 2009/0172286 A1 | 7/2009 | Lasser et al. |
| 2010/0169540 A1 | 7/2010 | Sinclair |

FOREIGN PATENT DOCUMENTS

| | | | |
|---|---|---|---|
| WO | 2008/121206 A1 | 10/2008 | |

OTHER PUBLICATIONS

U.S. Appl. No. 12/345,990, filed Dec. 30, 2008, 34 pages.
International Search Report issued in international application No. PCT/US2009/068203, mailed on Apr. 1, 2010 (7 pages).
Written Opinion issued in international application No. PCT/US2009/068203, mailed on Apr. 1, 2010 (7 pages).
Yim, Keun Soo, "A Novel Memory Hierarchy for Flash Memory Based Storage Systems", Journal of Semiconductor Technology and Science, v5 i4, pp. 262-269, 2005.
Chang, Li-Pin, "Hybrid Solid-State Disks: Combining Heterogeneous NAND Flash in Large SSDs", Design Automation Conference, Mar. 21-24, 2008, pp. 428-433.
Office Action issued in U.S. Appl. No. 12/345,990, mailed Feb. 25, 2011 (16 pages).
Office Action issued in U.S. Appl. No. 12/345,990 on Sep. 21, 2011.
Office Action issued in U.S. Appl. No. 12/345,990 on Feb. 25, 2011.
Office Action issued in U.S. Appl. No. 11/954,946 on Aug. 2, 2010.
Office Action issued in U.S. Appl. No. 11/954,946 on Mar. 15, 2011.
Notice of Allowance issued in U.S. Appl. No. 11/954,946 on Oct. 18, 2011.
Notice of Allowance issued in U.S. Appl. No. 11/967,369 on May 18, 2010.
International Search Report issued in International Application No. PCT/US2008/086247 on Jul. 27, 2009.
Written Opinion issued in International Application No. PCT/US2008/086247 on Jul. 27, 2009.

* cited by examiner

METHOD AND APPARATUS FOR RETROACTIVE ADAPTATION OF DATA LOCATION

TECHNICAL FIELD

This disclosure relates generally to storage of data on storage devices and, more particularly, to storage of data in different regions of a storage device.

BACKGROUND

Non-volatile memory systems, such as flash memory, have been widely adopted for use in consumer products. Flash memory may be found in different forms, for example in the form of a portable memory card that can be carried between host devices or as a solid state drive (SSD) embedded in a host device. Two general memory cell architectures found in flash memory include NOR and NAND. In a typical NOR architecture, memory cells are connected between adjacent bit line source and drain diffusions that extend in a column direction with control gates connected to word lines extending along rows of cells. A memory cell includes at least one storage element positioned over at least a portion of the cell channel region between the source and drain. A programmed level of charge on the storage elements thus controls an operating characteristic of the cells, which can then be read by applying appropriate voltages to the addressed memory cells.

A typical NAND architecture utilizes strings of more than two series-connected memory cells, such as 16 or 32, connected along with one or more select transistors between individual bit lines and a reference potential to form columns of cells. Word lines extend across cells within many of these columns. An individual cell within a column is read and verified during programming by causing the remaining cells in the string to be turned on so that the current flowing through a string is dependent upon the level of charge stored in the addressed cell.

NAND flash memory can be fabricated in the form of single-level cell flash memory, also known as SLC or binary flash, where each cell stores one bit of binary information. NAND flash memory can also be fabricated to store multiple states per cell so that two or more bits of binary information may be stored. This higher storage density flash memory is known as multi-level cell or MLC flash. MLC flash memory can provide higher density storage and reduce the costs associated with the memory. The higher density storage potential of MLC flash tends to have the drawback of less durability than SLC flash in terms of the number write/erase cycles a cell can handle before it wears out. MLC can also have slower read and write rates than the more expensive and typically more durable SLC flash memory.

It is desirable to provide for systems and methods to address the strengths and weaknesses noted above of these different types of non-volatile memory.

SUMMARY

In order to address the problems noted above, a method and system for retroactive adaptation of data storage locations is disclosed, where data usage patterns for groups of data are used to determine which type of memory in a storage device is currently best suited for storing each particular group of data.

According to a first aspect of the invention, a method is disclosed for managing movement of data in a non-volatile storage device between a first type of non-volatile memory in the storage device and a second type of non-volatile memory in the storage device. The method includes periodically determining a data usage status of a group of data in the first type of non-volatile memory and comparing the determined data usage status to a data usage criterion. If the data usage status satisfies the data usage criterion the group of data is transferred from the first type of non-volatile memory to the second type of non-volatile memory, where the first type of non-volatile memory comprises a higher endurance memory than the second type of non-volatile memory. In other embodiments, the data usage status for groups of data in both the first and second types of non-volatile memory are analyzed and compared to first and second data usage criteria, respectively, so that groups of data may be moved from one type of non-volatile to the other in the storage device based on whether the usage of each group of data satisfies the respective data usage criteria.

According to another aspect, a method of managing movement of data in a non-volatile storage device between a first type of non-volatile memory in the memory device and a second type of non-volatile memory in the storage device is provided. The method includes initially storing each group of data received from a host in the first type of non-volatile memory as each group of data is received at the storage device and periodically determining a data usage status of each group of data received in the first type of non-volatile memory. The method further includes comparing the determined data usage status to a data usage criteria and, if the data usage status of a particular group of data satisfies the usage criteria, transferring the particular group of data from the second type of non-volatile memory to the first type of non-volatile memory in the storage device, where the first type of non-volatile memory comprises a higher endurance memory than the second type of non-volatile memory.

In yet another aspect, a method of managing movement of data in a non-volatile storage device between a first type of non-volatile memory in the memory device and a second type of non-volatile memory in the storage device, the method involves initially storing each group of data received from a host in the second type of non-volatile memory as each group of data is received at the storage device and periodically determining a data usage status of each group of data in the second type of non-volatile memory. The determined data usage status is compared to a data usage criteria and a particular group of data from the second type of non-volatile memory is transferred to the first type of non-volatile memory when the data usage status satisfies the usage criteria, where the first type of non-volatile memory comprises a lower storage density capacity than the second type of non-volatile memory.

In another aspect of the invention, a non-volatile storage device for managing movement of data between different types of non-volatile memory in the non-volatile storage device is disclosed. The non-volatile storage device includes a first type of non-volatile memory and a second type of non-volatile memory, where the second type of non-volatile memory is a lower endurance memory than the first type of non-volatile memory. A controller is in communication with the first and second types of non-volatile memory and is configured to periodically determine a data usage status of a group of data in the first type of non-volatile memory, compare the determined data usage status to a data usage criterion, and transfer the group of data from the first type of non-volatile memory to the second type of non-volatile memory when the data usage status satisfies the data usage criterion.

BRIEF DESCRIPTION OF THE PRESENTLY PREFERRED EMBODIMENTS

Figure 1:
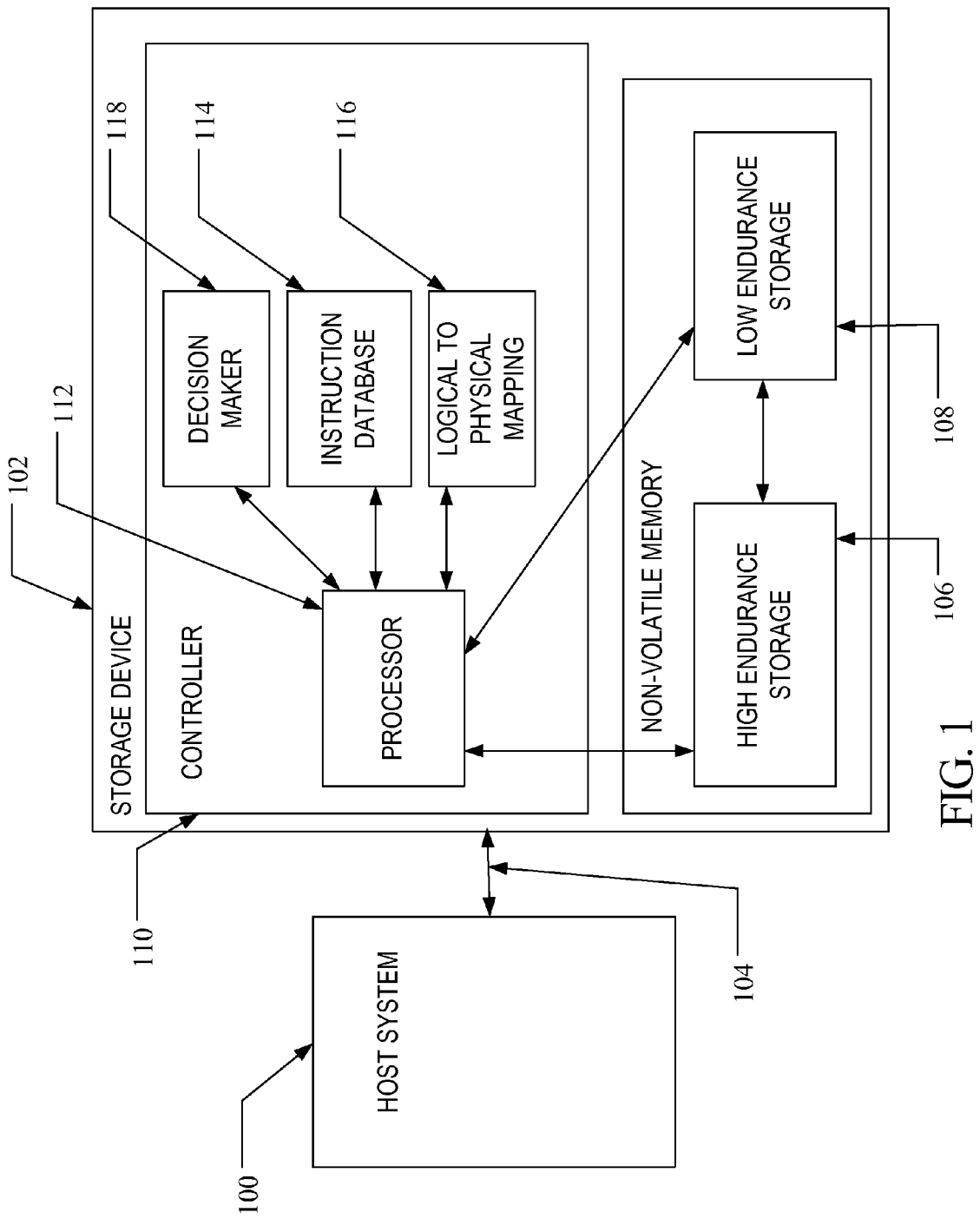
FIG. 1 is a block diagram of a memory system having a storage device with two types of non-volatile storage.

A flash memory system suitable for use in implementing aspects of the invention is shown in FIG. 1. A host system 100 stores data into, and retrieves data from, a storage device 102. The storage device 102 may be embedded in the host or may exist in the form of a card or other removable drive that is removably connected to the host 100 through a mechanical and electrical connector. The host 100 may be any of a number of data generating devices, such as a personal computer. The host 100 communicates with the storage device over a communication channel 104. The storage device 102 includes a controller 110 that may include a processor 112, instructions 114 for operating the processor 112, a logical block to physical block translation table 116 and a decision maker module 118 for determining when to transfer data from one type of flash memory to another.

The storage device 102 contains non-volatile memory cells of at least two different types: a higher endurance storage portion 106 and a lower endurance storage portion 108. In the embodiments described below, the term "endurance" refers to how many times a memory cell (i.e., a non-volatile solid state element) in a memory array can be reliably programmed. Typically, the more bits per memory cell that a particular type of non-volatile memory can handle, the fewer programming cycles it will sustain. Thus, a higher endurance storage portion 106 may be fabricated of single level cell (SLC) flash memory cells having a one bit (two states) per cell capacity while the lower endurance storage portion may consist of multi-level cell (MLC) flash memory cells having more than a one bit per cell capacity. The MLC flash memory cells may be able to store more information per cell, but they tend to have a lower durability and wear out in fewer programming cycles than SLC flash memory. While SLC and MLC flash memory cells are provided as one example of higher endurance and lower endurance storage portions, respectively, other types of non-volatile memory having relative differences in endurance may be used. Different combinations of flash memory types are also contemplated for the higher endurance and lower endurance storage portions 106, 108. For example, more than two types of MLC (e.g., 3 bits per cell and 4 bits per cell) may be used with SLC flash memory cells, such that there are multiple levels of endurance, or two or more different types of MLC flash memory cells may be used without using SLC cells. In the latter example, the MLC with the lower number of bits per cell would be considered the high endurance storage and the MLC with the higher bits per cell would be considered the low endurance storage. The processor 112 in the controller 110 may track and store information on the times of each write and/or read operation performed on groups of data. This log of read or write activity may be stored locally in memory available on the processor 112 or elsewhere in the storage device 102.

The higher endurance storage portion 106 and lower endurance storage portion 108, as mentioned above, may be non-volatile flash memory arranged in blocks of memory cells. A block of memory cells is the unit of erase, i.e., the smallest number of memory cells that are physically erasable together. For increased parallelism, however, the blocks may be operated in larger metablock units. One block from each plane of memory cells may be logically linked together to form a metablock. In a storage device where the higher endurance storage portion 106 is in an SLC configuration and the lower endurance storage portion 108 is in an MLC configuration, a metablock arrangement is useful because multiple cache blocks may be needed to store an amount of data equal to one main storage block.

Figure 2:
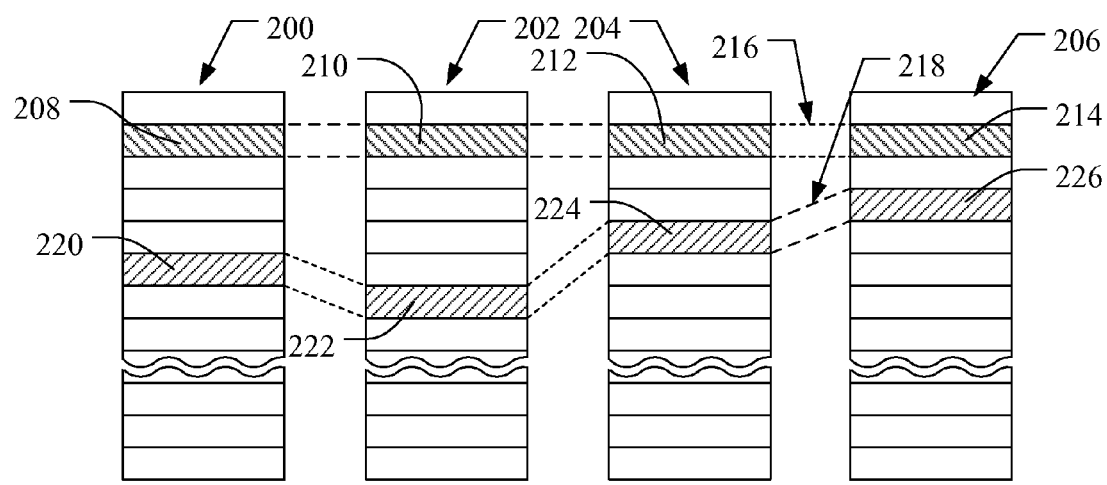
FIG. 2 illustrates an example physical memory organization of the system of FIG. 1.

Referring to FIG. 2, a conceptual illustration of a representative flash memory cell array is shown. Four planes or sub-arrays 200, 202, 204 and 206 memory cells may be on a single integrated memory cell chip, on two chips (two of the planes on each chip) or on four separate chips. The specific arrangement is not important to the discussion below and other numbers of planes may exist in a system. The planes are individually divided into blocks of memory cells shown in FIG. 2 by rectangles, such as blocks 208, 210, 212 and 214, located in respective planes 200, 202, 204 and 206. There may be dozens or hundreds of blocks in each plane. Blocks may be logically linked together to form a metablock that may be erased as a single unit. For example, blocks 208, 210, 212 and 214 may form a first metablock 216. The blocks used to form a metablock need not be restricted to the same relative locations within their respective planes, as is shown in the second metablock 218 made up of blocks 220, 222, 224 and 226.

Figure 3:
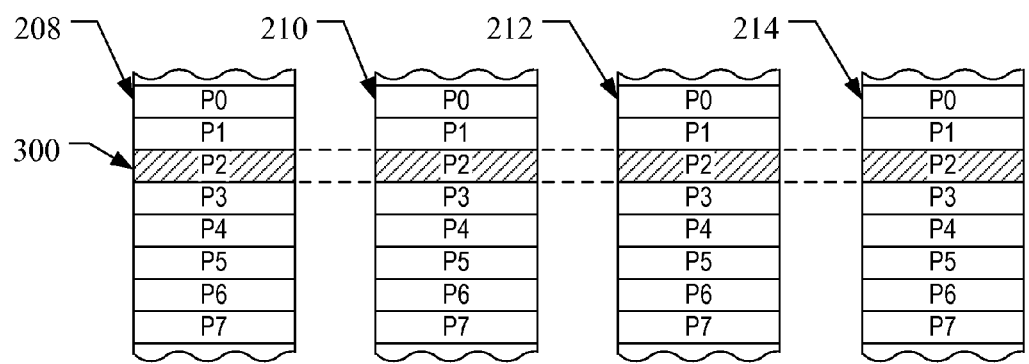
FIG. 3 shows an expanded view of a portion of the physical memory of FIG. 2.

The individual blocks are in turn divided for operational purposes into pages of memory cells, as illustrated in FIG. 3. The memory cells of each of blocks 208, 210, 212 and 214, for example, are each divided into eight pages P0-P7. Alternately, there may be 16, 32 or more pages of memory cells within each block. A page is the unit of data programming (writing) and reading within a block, containing the minimum amount of data that are programmed (written) or read at one time. A metapage 300 is illustrated in FIG. 3 as formed of one physical page for each of the four blocks 208, 210, 212 and 214. The metapage 300 includes the page P2 in each of the four blocks but the pages of a metapage need not necessarily have the same relative position within each of the blocks. A metapage is the maximum unit of programming. The blocks disclosed in FIGS. 2-3 are referred to herein as physical blocks because they relate to groups of physical memory cells as discussed above. As used herein, a logical block is a virtual unit of address space defined to have the same size as a physical block. Each logical block includes a range of logical block addresses (LBAs) that are associated with data received from a host 100. The LBAs are then mapped to one or more physical blocks in the storage device 102 where the data is physically stored.

In operation, the storage device 102 will receive data from the host 100 associated with host write commands. The data received at the storage device 102 is addressed in logical blocks of addresses by the host 100 and, when the data is stored in the storage device 102, the processor 112 tracks the mapping of logical addresses to physical addresses in a logical to physical mapping table 116. When a storage device 102, such as the example shown in FIG. 1, includes more than one type of storage, such as the higher endurance and lower endurance storage portions 106, 108, optimizing the location of groups of data in these different areas to account for the cost, speed or endurance of the type of memory can permit greater overall performance and life-span for the storage device. As used herein, a "group" of data may refer to a sector, page, block, file or any other data object.

Figure 4:
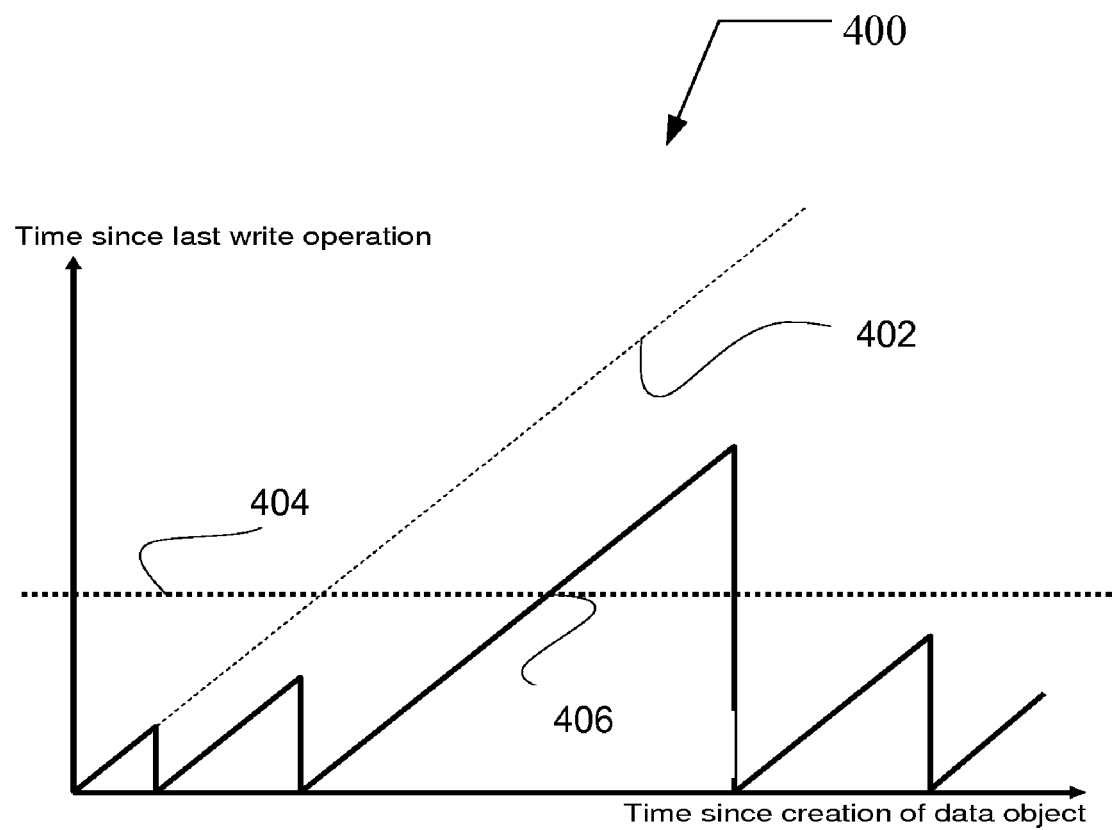
FIG. 4 is a graph illustrating an activity threshold for transferring data between different types of non-volatile storage in a storage device.

In order to optimize the use of the different memory types 106, 108 in the storage device 102, the storage device 102 is configured to implement a host data usage analysis to determine, based on the usage of each group of data in the non-volatile memory, whether to move that group from one memory type to another in the storage device 102. As illustrated in FIG. 4, a demotion policy is illustrated in the form of a data write activity graph 400 illustrating the time since the creation of a group of data along the x-axis against the time since a last write operation occurred involving that data object (y-axis). If a group of data (referred to as a data object in the example of FIG. 4) is never written to after it is created, a trace 402 having a linear slope would be the result. If, as shown in trace 406, a group of data is written to at different periods of time, the trace returns to zero times since a last write operation each time a write operation takes place, followed by a linear slope until a next write operation occurs. By setting a policy where a certain elapsed time, or combination of elapsed and other parameters, is used to provide a threshold 404, a decision may be made by the storage device 102 to move (demote) a group of data from the higher endurance storage 106 to the lower endurance storage 108 when the group of data has not been written to for a particular amount of time. Thus, the intersection of the threshold 404 with the trace 406 would indicate that the particular group of data represented by trace 406 which is currently stored in the higher endurance storage portion 106 has been inactive for a period of time that merits its movement, or demotion, from the higher endurance storage 106 to the lower endurance storage 108.

Figure 5:
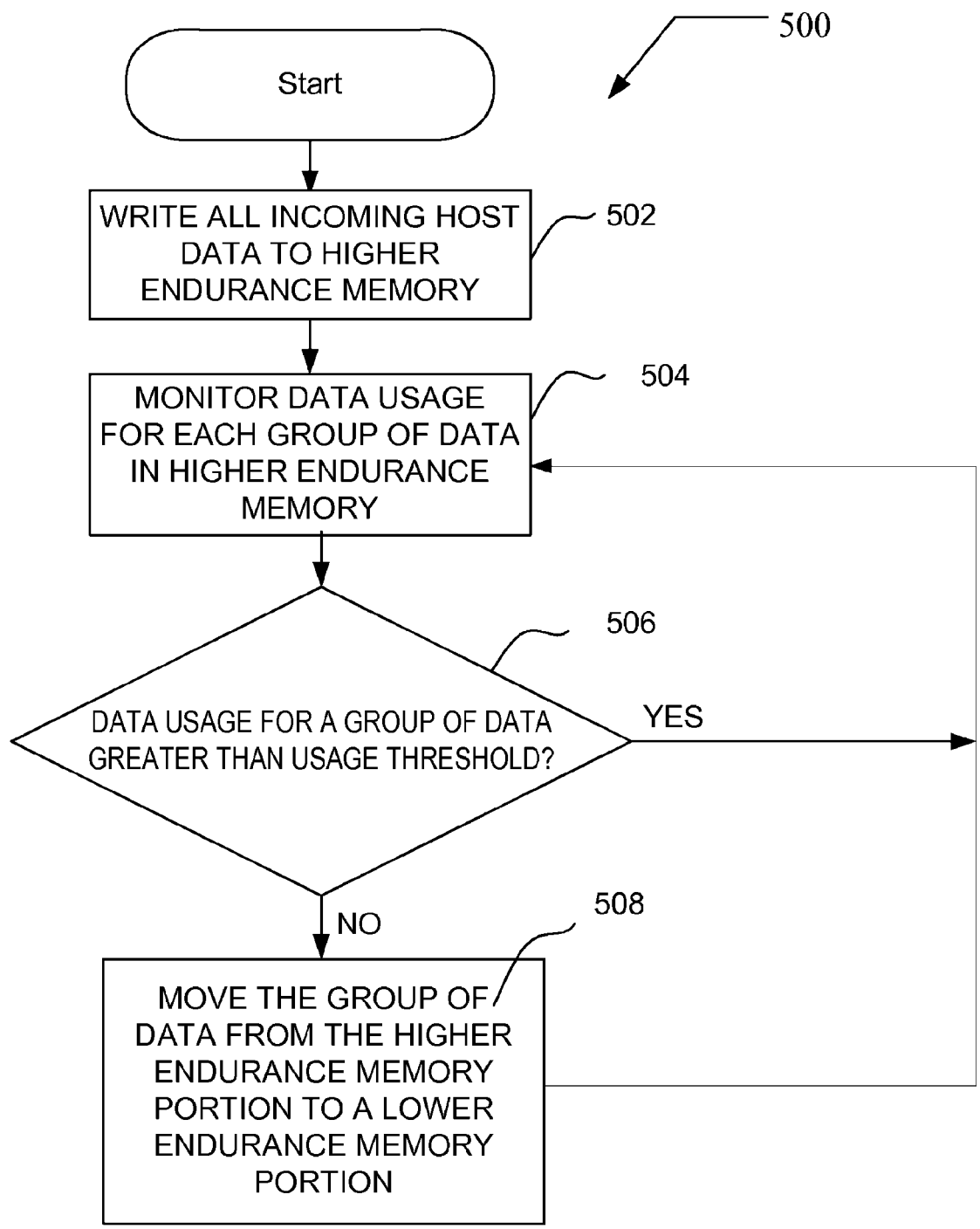
FIG. 5 is a flow diagram illustrating a method of transferring data from a high endurance portion of non-volatile memory to a lower endurance portion of non-volatile memory according to an embodiment.

Referring to FIG. 5, a chart 500 showing a method of implementing such a demotion policy is set forth. In the embodiment of FIG. 5, all incoming host data is initially written to the higher endurance memory 106 (at step 502). Each group of data in the higher endurance memory is monitored to determine its data usage (at step 504). The data usage information is then compared to data usage criteria, which may be a single parameter or threshold, or a combination of parameters and/or thresholds. If the data usage information for a particular group of data satisfies the data usage criteria, then the group of data is maintained in the higher endurance memory because the higher activity surrounding that group of data indicates that it should remain in the higher endurance flash (at step 506). For example, if the data usage criteria consists of a threshold amount of time since a last write operation and the data usage information for particular group of data in the higher endurance storage portion 106 indicates a write operation occurred in a time less than or equal to the threshold, that group of data would remain in the higher endurance storage portion 106. Alternatively, if the data usage for the group of data indicates that the elapsed time since the last write operation for that group of data exceeds the threshold, the group of data is demoted to the lower endurance storage portion 108 (at steps 506, 508) because the lower endurance storage portion 108 is better suited for the lower level of activity than the more expensive higher endurance storage portion.

Rather than being implemented as a demotion policy, as shown in FIG. 5, another embodiment the movement of data based on usage patterns may be made via a promotion policy where data is moved from the lower endurance memory to the higher endurance memory. Referring to the flow chart 600 of FIG. 6, in this embodiment, all incoming host data is originally written to the lower endurance memory 108 (at step 602). The controller 110 monitors data usage for each group of data in the lower endurance memory 108 (at step 604). As with the demotion policy of FIG. 5, in the promotion policy of FIG. 6 data usage for each group of data is again compared to the usage threshold maintained in the controller 110 (at step 606). If the data usage is less than the usage threshold then the data remains in the lower endurance memory 108 (at step 606). In contrast, if there has been sufficient data usage for the group of data such that the data usage threshold is surpassed, then the group of data would be moved, or promoted, from the lower endurance memory 108 to the higher endurance memory 106 (at steps 606, 608).

Figure 6:
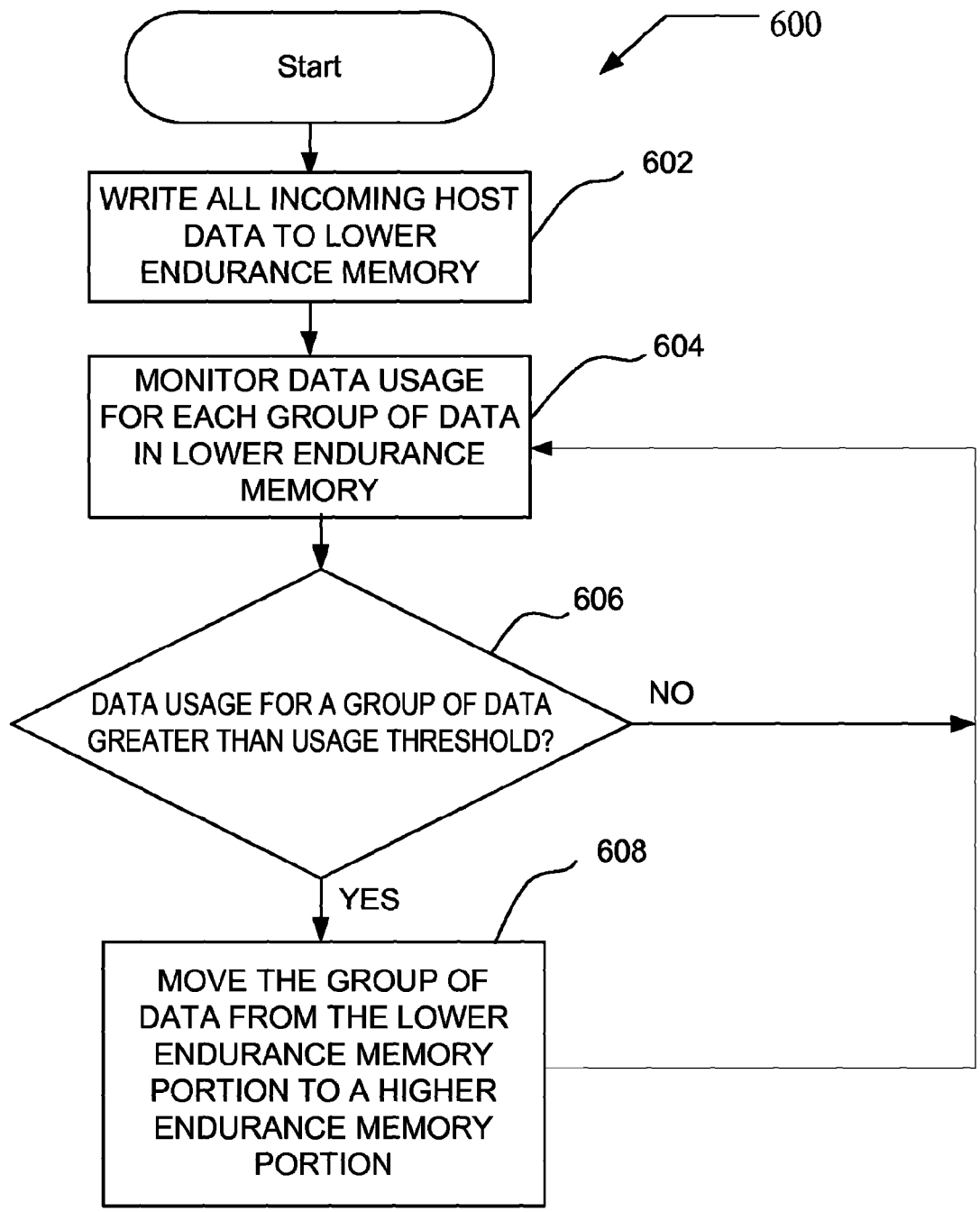
FIG. 6 is a flow diagram illustrating a method of transferring data from a low endurance portion of non-volatile memory to a higher endurance portion of non-volatile memory according to an embodiment.

In the embodiments of FIGS. 5 and 6, a demotion-only or promotion-only policy is described. It is also contemplated that a bi-directional policy may be implemented in another embodiment. This bi-directional policy is illustrated in the chart 700 of FIG. 7 where data usage for each group of data is monitored in both the lower endurance storage portion 108 and the higher endurance storage portion 106 (at step 702). The monitored data usage for each group of data is compared to the usage criterion or criteria maintained by the controller 110 (at step 704). The usage criteria compared to the data usage status for groups of data in the higher endurance storage portion 106 may be the same or different as the usage criteria compared to the data usage status determined for groups of data in the lower performance storage portion 108. If the usage criteria is simply a threshold amount of time since the last write operation to a group of data and the data usage status for the group of data is less than the threshold then, if that group of data is in the higher endurance memory portion 106, it is moved to the lower endurance memory portion 108 (at step 708). Alternatively, (assuming the same data usage criteria) if the data usage is greater than the threshold and the group of data is currently in the lower endurance memory portion 108, that group of data is moved to the higher endurance memory portion 106 (at step 706). In other embodiments, the usage criteria may differentiate between write activity and read activity, where only write activity is considered usage, only a certain amount of read activity is also considered usage, or a combination of read and write activity to a group of data is considered usage.

The monitoring of data usage for a group of data, and any resultant moving of groups of data, may be performed periodically as a background process when the storage device 102 is idle or when the read or write operation occurs that exceeds the threshold of usage criteria for the group of data. In one implementation, the processor 112 of the controller 110 may execute instructions for implementing the demotion, promotion or bi-directional data movement policies described above. The instructions may be processor executable instructions maintained in software or firmware in the storage device 102, for example in an instruction database 116 illustrated in FIG. 1.

Figure 7:
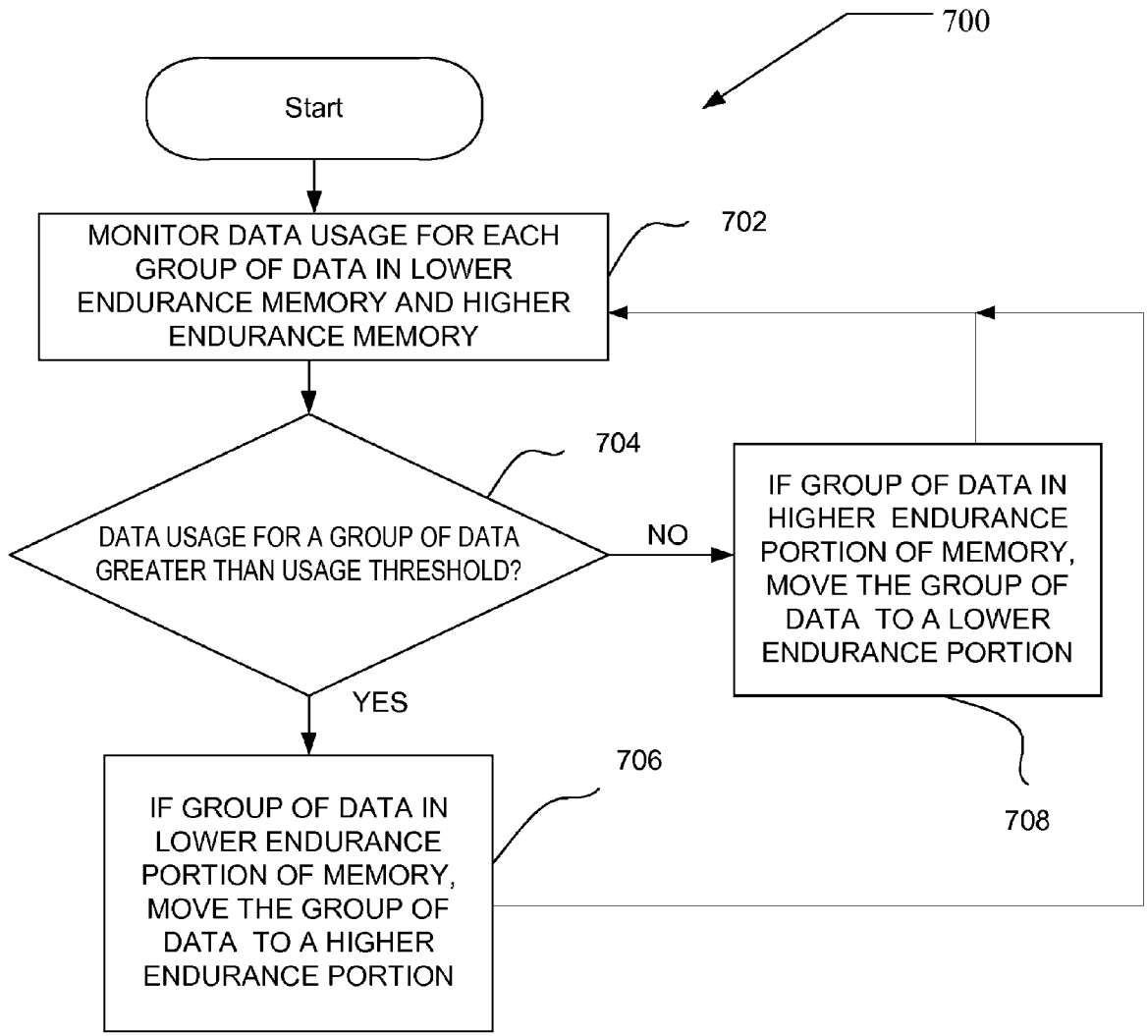
FIG. 7 is a flow diagram illustrates a method of transferring data between high endurance and low endurance portions of non-volatile memory.

In each of the embodiments discussed in FIGS. 5-7, the data usage that is monitored for each group of data may be a single parameter or a combination of parameters. For example, data usage could be based on a counter maintained in RAM (not shown) in the controller for each group of data, where the counter may identify how many times a group of data has been approached for a read or a write operation, for only a read operation, for only a write operation, or any combination of read and write operations. The data usage parameter may also include an elapsed time element such that data usage is simply an amount of time since a last approach to the group of data, where an approach may be any host access of the group of data via a read or write operation. In yet other embodiments, the data usage being monitored may include only the number of times a group of data is written to or the elapsed time since a group of data was last written to, or a combination of both. The processor 112 and the controller 110 may monitor one or more of these parameters based on the logical mapping activity of the groups of data. For example, if the storage device is configured in a FAT format, the file allocation table may be consulted to determine the time of last activity for a group of data. The elapsed time between reads or writes and the number of reads or writes may be tracked with the decision maker module 118. The decision maker module 118 may include a table or an algorithm that lists or tracks elapsed time for use by the processor 112.

In yet other embodiments, the data usage criteria that the controller 110 compares to the monitored data usage parameter or parameters may include storage device deterioration factors. One such memory deterioration factor may be the total number of writes made for the group of data. For example, the controller 110 can automatically move sectors of data from an area deemed to be a deteriorating region of memory to a safer area, within the same storage portion 106, 108 or from one storage portion to another. Such a memory deterioration factor may bypass the typical usage determination such that, regardless of the monitored usage and the result of comparing the data usage criteria to the monitored data usage, if a threshold amount of deterioration in a storage area has occurred, the data will automatically be moved. In other embodiments, the read or write speed needs for a group of data may also be factored into the data usage criteria.

With respect to the bi-directional embodiment of FIG. 7, where promotion and demotion from the higher endurance and lower endurance storage portions are both executed, the usage threshold may be the same for demotion from the higher endurance storage portion as with promotion from the lower endurance storage portion. The elapsed time thresholds for promotion or demotion may be the same, for example one minute. Alternatively, the thresholds for promotion and demotion may differ from one another. For example, the threshold for demoting from the higher endurance storage portion may be an elapsed time of one minute, while the threshold for promoting a group of data from the lower endurance storage portion to the higher endurance storage portion may be one day. In this manner, a hysteresis-like effect may be arranged to bias movement from one type of storage towards the other type of storage (e.g. from higher endurance storage to lower endurance storage). In yet other embodiments, the criteria for data usage may be user determined and set-up for the particular storage device 102 when the storage device is first connected to a host 100 and initialized.

A method and system have been disclosed for implementing a retroactive adaptation of data location within a non-volatile memory having storage portions with different performance characteristics, such as different endurance ratings. The data demotion-only, promotion-only, and combined bi-directional promotion and demotion between the different types of storage in the storage device each help to move data to an appropriate part of the memory based on actual usage of the group of data. The disclosed system and method provide the advantage of more accurately and dynamically matching groups of data to the type of non-volatile storage best suited for the group of data than only predicting, at the time the data is received from a host, where each group of data should be placed. Although there may be some processing overhead cost in a storage device that moves data between the different storage portions, the overall performance of a storage device may be improved by properly allocating data groups into the appropriate storage portions based on the actual usage pattern of the data.

The invention claimed is:

1. A method of managing movement of data in a non-volatile storage device between a first type of non-volatile memory in the storage device and at least a second type of non-volatile memory in the storage device, the method comprising:
monitoring and analyzing data activity in the first type of non-volatile memory and in the second type of non-volatile memory on a periodic basis to determine a data usage status of a group of data in the first and second type of non-volatile memory, respectively;
comparing the determined data usage status to a data usage criterion;
transferring the group of data from the first type of non-volatile memory to the second type of non-volatile memory when the data usage status is lower than the data usage criterion, and maintaining the group of data in the first type of non-volatile memory when the data usage status is not lower than the data usage criterion;
transferring the group of data from the second type of non-volatile memory to the first type of non-volatile memory when the data usage status is greater than the data usage criterion, and maintaining the group of data in the second type of non-volatile memory when the data usage status is not greater than the data usage criterion;
wherein the first type of non-volatile memory comprises a higher endurance memory than the second type of non-volatile memory, and wherein data is bidirectionally transferred between the first and second types of non-volatile memory on a periodic basis depending on the data usage status.

2. The method of claim 1, wherein determining the data usage status comprises determining a time of a last host write operation for the group of data.

3. The method of claim 2, wherein determining the time of the last host write operation for the group of data comprises retrieving a last host write time stored in the storage device.

4. The method of claim 3, wherein the data usage criterion comprises an elapsed time threshold and comparing the determined data usage status to the data usage criterion comprises comparing an elapsed time based on the last host write time to the elapsed time threshold, and wherein the data usage status satisfies the data usage criterion if the elapsed time is greater than or equal to the elapsed time threshold.

5. The method of claim 1, wherein determining the data usage status comprises determining a time of last host access to the group of data.

6. The method of claim 1, wherein the group of data comprises one of a sector, a page, a block or a file.

7. The method of claim 1, including a second data usage criterion that is different than the data usage criterion.

8. The method of claim 1, wherein the first type of non-volatile memory comprises single level cell (SLC) memory.

9. The method of claim 8 wherein the second type of non-volatile memory comprises multi-level cell (MLC) memory.

10. A method of managing movement of data in a non-volatile storage device between a first type of non-volatile memory in the storage device and a second type of non-volatile memory in the storage device, the method comprising:

initially storing each group of data received from a host in the first type of non-volatile memory as each group of data is received at the storage device;

monitoring and analyzing data activity in the first type of non-volatile memory and in the second type of non-volatile memory on a periodic basis to determine a data usage status of each group of data received in the first and second type of non-volatile memory in the storage device;

comparing the determined data usage status to a data usage criterion;

transferring the group of data from the first type of non-volatile memory to the second type of non-volatile memory when the data usage status is lower than the data usage criterion, and maintaining the group of data in the first type of non-volatile memory when the data usage status is not lower than the first data usage criterion;

transferring the group of data from the second type of non-volatile memory to the first type of non-volatile memory when the data usage status is greater than the data usage criterion, and maintaining the group of data in the second type of non-volatile memory when the data usage status is not greater than the data usage criterion; and wherein the first type of non-volatile memory comprises a higher endurance memory than the second type of non-volatile memory and wherein the data is bidirectionally transferred between the first and second types of non-volatile memory on a periodic basis depending on the data usage status.

11. The method of claim 10, wherein determining the data usage status comprises determining a time of a last host write operation for the group of data.

12. The method of claim 11, wherein determining the time of the last host write operation for the group of data comprises retrieving a last host write time stored in the storage device.

13. The method of claim 12, wherein the data usage criterion comprises an elapsed time threshold and comparing the determined data usage status to the data usage criterion comprises comparing an elapsed time based on the last host write time to the elapsed time threshold, and wherein the data usage status satisfies the data usage criterion if the elapsed time is greater than or equal to the elapsed time threshold.

14. The method of claim 10, wherein determining the data usage status comprises determining a time of last host access of the group of data.

15. The method of claim 10, wherein the group of data comprises one of a sector, a page, a block or a file.

16. A method of managing movement of data in a non-volatile storage device between a first type of non-volatile memory in the storage device and a second type of non-volatile memory in the storage device, the method comprising:

initially storing each group of data received from a host in the second type of non-volatile memory as each group of data is received at the storage device;

monitoring and analyzing data activity in the first type of non-volatile memory and in the second type of non-volatile memory on a periodic basis to determine a data usage status of each group of data in the first and second type of non-volatile memory in the storage device;

comparing the determined data usage status to a data usage criteria;

transferring the group of data from the first type of non-volatile memory to the second type of non-volatile memory when the data usage status is lower than the data usage criterion, and maintaining the group of data in the first type of non-volatile memory when the data usage status is not lower than the first data usage criterion;

transferring the group of data from the second type of non-volatile memory to the first type of non-volatile memory when the data usage status is greater than the data usage criterion, and maintaining the group of data in the second type of non-volatile memory when the data usage status is not greater than the data usage criterion; and wherein the first type of non-volatile memory comprises a higher endurance memory than the second type of non-volatile memory and wherein the data is bidirectionally transferred between the first and second types of non-volatile memory on a periodic basis depending on the data usage status.

17. The method of claim 16, wherein determining the data usage status comprises determining a time of a last host write operation for the group of data.

18. The method of claim 17, wherein determining the time of the last host write operation for the group of data comprises retrieving a last host write time stored in the storage device.

19. The method of claim 16, wherein determining the data usage status comprises determining a time of last host access of the group of data.

20. An non-volatile storage device for managing movement of data between different types of non-volatile memory in the non-volatile storage device, comprising:

a first type of non-volatile memory;

a second type of non-volatile memory, the second type of non-volatile memory comprising a lower endurance memory than the first type of non-volatile memory; and a controller in communication with the first and second types of non-volatile memory, the controller configured to:

monitor and analyze data activity in the first type of non-volatile memory and in the second type of non-volatile memory on a periodic basis to determine a data usage status of a group of data in the first and second type of non-volatile memory;

compare the determined data usage status to a data usage criterion;

transfer the croup of data from the first type of non-volatile memory to the second type of non-volatile memory when the data usage status is lower than the data usage criterion, and maintain the group of data in the first type of non-volatile memory when the data usage status is not lower than the first data usage criterion; and transfer the group of data from the second type of non-volatile memory to the first type of non-volatile memory when the data usage status is greater than the data usage criterion, and maintain the group of data in the second type of non-volatile memory when the data usage status is not greater than the data usage criterion.

* * * * *

UNITED STATES PATENT AND TRADEMARK OFFICE
CERTIFICATE OF CORRECTION

PATENT NO. : 8,261,009 B2
APPLICATION NO. : 12/345992
DATED : September 4, 2012
INVENTOR(S) : Guy Freikorn It is certified that error appears in the above-identified patent and that said Letters Patent is hereby corrected as shown below:

In the Claims:

In column 10, claim 20, line 48, after "transfer the" replace "croup" with --group--.

Signed and Sealed this
Thirtieth Day of April, 2013

Teresa Stanek Rea
*Acting Director of the United States Patent and Trademark Office*